(12) United States Patent
Lin et al.

(10) Patent No.: US 12,151,379 B2
(45) Date of Patent: Nov. 26, 2024

(54) METHOD OF ROBOT DYNAMIC MOTION PLANNING AND CONTROL

(71) Applicant: FANUC CORPORATION, Yamanashi (JP)

(72) Inventors: Hsien-Chung Lin, Fremont, CA (US); Chiara Talignani Landi, Reggio Emilia (IT); Chi-Keng Tsai, Bloomfield Hills, MI (US); Tetsuaki Kato, Fremont, CA (US)

(73) Assignee: FANUC CORPORATION, Yamanashi (JP)

( * ) Notice: Subject to any disclaimer, the term of this patent is extended or adjusted under 35 U.S.C. 154(b) by 443 days.

(21) Appl. No.: 17/457,696

(22) Filed: Dec. 6, 2021

(65) Prior Publication Data

US 2023/0302645 A1 Sep. 28, 2023

(51) Int. Cl.
  *B25J 9/16* (2006.01)
  *B25J 13/08* (2006.01)

(52) U.S. Cl.
  CPC .......... *B25J 9/1666* (2013.01); *B25J 9/1651* (2013.01); *B25J 13/08* (2013.01); *B25J 9/1643* (2013.01);
  (Continued)

(58) Field of Classification Search
  CPC ........ B25J 9/1666; B25J 9/1651; B25J 13/08; G05B 2219/31005; G05B 2219/39001
  See application file for complete search history.

(56) References Cited

U.S. PATENT DOCUMENTS

| 9,327,401 B2 | 5/2016 | Xiao et al. | |
| 2019/0255712 A1* | 8/2019 | Takeuchi | G05B 19/409 |
| 2023/0117928 A1* | 4/2023 | Bellicoso | B25J 13/089 |
| | | | 700/255 |

FOREIGN PATENT DOCUMENTS

EP   2699392 B1   10/2015

OTHER PUBLICATIONS

Ferraguti, Federica, et al. "Safety barrier functions and multi-camera tracking for human-robot shared environment." Robotics and Autonomous Systems 124 (2019): 103388.
(Continued)

*Primary Examiner* — Adam R Mott
*Assistant Examiner* — Matthew C Gammon
(74) *Attorney, Agent, or Firm* — John A. Miller; Shumaker, Loop & Kendrick, LLP

(57) ABSTRACT

A method and system for motion planning for robots with a redundant degree of freedom. The technique computes a collision avoidance motion plan for a robot with a redundant degree of freedom, without artificially constraining the extra degree of freedom. The motion planning is formulated as a quadratic programming optimization calculation having a multi-component objective function and a collision avoidance constraint function. The formulation is efficient enough to compute the motion plan in real time at every robot control cycle. The collision avoidance constraint ensures clearance of all parts of the robot from both static and dynamic obstacles. Objective function terms include minimizing path deviation, joint velocity regularization and robot configuration or pose regularization. Weighting factors on the terms of the objective function are changeable for each control cycle calculation based on obstacle proximity conditions at the time.

27 Claims, 10 Drawing Sheets

(52) U.S. Cl.
CPC .............. *G05B 2219/31005* (2013.01); *G05B 2219/39001* (2013.01)

(56) References Cited

OTHER PUBLICATIONS

Ferraguti, Federica, et al. "A Control Barrier Function Approach for Maximizing Performance While Fulfilling to ISO/TS 15066 Regulations," in IEEE Robotics and Automation Letters, vol. 5, No. 4, pp. 5921-5928, Oct. 2020.

* cited by examiner

METHOD OF ROBOT DYNAMIC MOTION PLANNING AND CONTROL

BACKGROUND

Field

The present disclosure relates generally to the field of industrial robot motion planning and, more particularly, to a method and system for motion planning for robots with a redundant degree of freedom, including the presence of dynamic obstacles, where the motion planning is formulated as a quadratic programming optimization calculation having a multi-component objective function and a collision avoidance constraint function, and where weighting factors on the terms of the objective function are changeable for each control cycle calculation based on obstacle proximity conditions at the time.

Discussion of the Related Art

The use of industrial robots to perform a wide range of manufacturing, assembly and material movement operations is well known. In some applications, the robot being employed has more degrees of freedom (DOF) than the task being performed. This is the case when a conventional six-DOF robot is used for a five-DOF task, such as where the rotational ("spin") position of the tool about its local axis is not important and can take on any value. Seven-DOF robots have also been designed to intentionally have more degrees of freedom than the required task (e.g., spray painting), where the extra degree of freedom improves the near-reach flexibility of the robot—such as enabling the robot arms to fold and fit in a narrow space between a vehicle body and a wall of a spray paint booth.

Techniques have been developed in the art for motion planning of robots with a redundant degree of freedom. One known technique involves defining a plane within which the robot elbow joint must remain. This extra constraint reduces the effective degrees of freedom of the robot by one, and enables motion planning to be computed analytically using inverse kinematics (IK) calculations. However, this technique artificially limits the flexibility of the robot, and requires an extra programming step for the operators to define the elbow joint plane.

Another known technique for motion planning of robots with a redundant degree of freedom exploits the redundant degree of freedom in the null space of the Jacobian matrix, then uses an optimization computation to compute robot motion. This technique has several drawbacks—including the lack of any constraints on the optimization computation, the optimization computation being limited to a single objective function variable at a time, and the technique being applicable only for robot teaching mode. The teaching mode limitation in turn introduces additional drawbacks—including the inability to handle line tracking applications (such as vehicle bodies moving on a conveyor), and the inability to perform dynamic obstacle avoidance calculations in the motion planning.

In many robot workspace environments, obstacles are present and may sometimes be in the path of the robot's motion. The obstacles may be permanent objects such as building structures and fixtures, which can easily be avoided by the robot with pre-planned motions due to the static nature of the object. The obstacles may also be dynamic objects which move into or through the robot workspace at random. Dynamic objects must be accounted for in real-time calculations by the motion planning system, where the robot must maneuver to avoid the objects while performing an operation. Collisions between any part of the robot and any obstacle must absolutely be avoided, and simply stopping the robot in the presence of dynamic obstacles is not a satisfactory solution.

In light of the circumstances described above, there is a need for an improved dynamic motion planning technique for redundant robots which permits full flexibility of the robot, includes obstacle avoidance in the robot motion when dynamic objects exist in the workspace, and completes the motion planning computations rapidly enough to be performed during each robot control cycle.

SUMMARY

In accordance with the teachings of the present disclosure, a method and system for motion planning for robots with a redundant degree of freedom is described and illustrated. The technique computes a collision avoidance motion plan for a robot with a redundant degree of freedom, without artificially constraining the extra degree of freedom. The motion planning is formulated as a quadratic programming optimization calculation having a multi-component objective function and a collision avoidance constraint function. The formulation is efficient enough to compute the motion plan in real time at every robot control cycle. The collision avoidance constraint ensures clearance of all parts of the robot from both static and dynamic obstacles. Objective function terms include minimizing path deviation, joint velocity regularization and robot configuration or pose regularization. Weighting factors on the terms of the objective function are changeable for each control cycle calculation based on obstacle proximity conditions at the time.

Additional features of the presently disclosed systems and methods will become apparent from the following description and appended claims, taken in conjunction with the accompanying drawings.

DETAILED DESCRIPTION OF THE EMBODIMENTS

The following discussion of the embodiments of the disclosure directed to dynamic motion planning and control for redundant robots is merely exemplary in nature, and is in no way intended to limit the disclosed devices and techniques or their applications or uses.

It is well known to use industrial robots for a variety of manufacturing, assembly and material movement operations. In some applications, the robot has more degrees of freedom of motion than the number of degrees of freedom of the task being performed. This is the case, for example, when a seven-axis robot is used for a spray painting application in which the spray nozzle position and pose are fully defined by six degrees of freedom.

Furthermore, in many robot workspace environments, obstacles may be present and may at times be in the path of the robot's motion. That is, without adaptive motion planning, some part of the robot may collide with some part of an obstacle when the robot moves from its current position to a destination position. The obstacles may be static structures such as fixtures and tables, or the obstacles may be dynamic (moving) objects such as people, forklifts and other machines. When dynamic objects may be present, the robot's motion must be planned in real time for each control cycle.

Techniques have been developed in the art for computing motions for robots having a redundant degree of freedom. However, these techniques exhibit a variety of shortcomings—including limiting the flexibility of the robot by requiring an artificial constraint to be defined, lack of sufficient control of the solution due to limitations in the optimization objective function and constraints, the capability to be used only in teaching mode and not in real time motion planning, and the resultant inability to handle dynamic obstacle avoidance or line tracking applications.

The dynamic motion planning system of the present disclosure overcomes the shortcomings of prior art systems by formulating the motion planning as a quadratic programming optimization calculation having a multi-component objective function and a collision avoidance constraint function. This technique results in a joint motion plan which seeks to minimize deviation from the planned path, balance joint velocities, and avoid mid-path robot configuration/pose changes—all while meeting a dynamic object collision avoidance constraint. The optimization computation is efficient enough to be performed in real time during robot motion, and the computation is further formulated such that weighting factors on the terms of the objective function are changeable for each control cycle calculation based on obstacle proximity conditions at the time.

Figure 1:
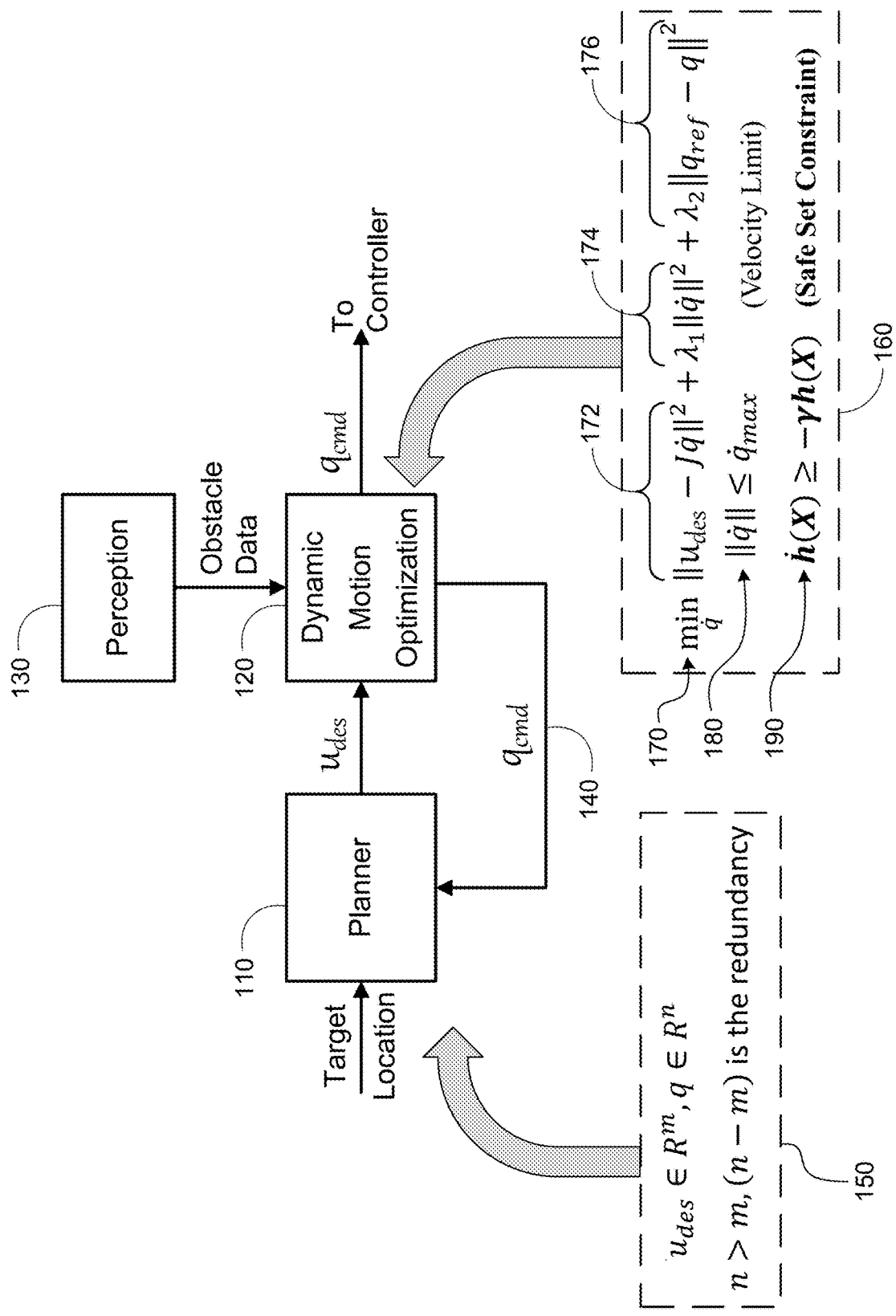
FIG. 1 is a block diagram illustration of a dynamic motion planning system for a redundant robot, including collision avoidance in the motion planning, according to an embodiment of the present disclosure.

FIG. 1 is a block diagram illustration of a dynamic motion planning system for a redundant robot, including collision avoidance in the motion planning, according to an embodiment of the present disclosure. A planner module 110 computes a planned robot motion based on an input target (destination) location. In one non-limiting example, the robot tool is a gripper, and the robot's task is to move a part from a source (starting) location to the target location. Of course, there are many other examples of tasks—such as moving from one spot-welding location to the next, moving to a new location to begin a spray-painting stroke, etc. In one embodiment, the planned robot motion $u_{des}$ is an acceleration vector defining "design" (planned) robot motion in Cartesian space. Specifically, $u_{des}$ may be defined as tool center point acceleration, which may also be represented as $\ddot{x}_{des}$, where x is the tool center point position and orientation in six degrees of freedom. Motion planning may also be performed using velocities rather than accelerations, in which case, $u_{des}$ would be defined as tool center point velocity, $\dot{x}_{des}$. The planner module 110 provides the planned robot motion $u_{des}$ to a dynamic motion optimization module 120.

The input target (destination) location may be a moving target—such as a vehicle body moving along a conveyor. In this type of "line tracking" application, the target location may be defined as a linear function of time based on conveyor velocity, or may even be computed for each control cycle for applications where the conveyor speed may vary. In any case, the target location for the robot tool is the location where the tool needs to be, at the time in the future when the robot arm is projected to arrive.

The dynamic motion optimization module 120 also receives obstacle data input from a perception module 130. The perception module 130 includes one or more cameras or sensors configured to provide data about obstacles which may exist in the robot workspace. The obstacle data typically includes a minimum robot-obstacle distance, and may also include other data about the position (including spatial shape) and velocity of any obstacles.

The dynamic motion optimization module 120 performs an optimization computation which minimizes tracking deviation from the planned robot motion $u_{des}$, and also optimizes robot motion characteristics, while including robot mechanical limitations and a collision avoidance safety function as constraints. This optimization computation results in a commanded robot motion $q_{cmd}$. The commanded robot motion $q_{cmd}$ is the robot motion in joint space which will take the robot tool to the target location while avoiding any obstacles in the robot workspace. The optimization computation is discussed in detail below. A feedback loop 140 provides the commanded robot motion $q_{cmd}$ from the dynamic motion optimization module 120 back to the planner module 110. The planner module 110 and the dynamic motion optimization module 120 repeat the calculations described above at each robot control cycle.

The dynamic motion optimization module 120 also provides the commanded robot motion $q_{cmd}$ to a robot controller, which provides robot control commands to a robot (not shown), and receives actual robot joint positions $q_{act}$ on a feedback loop, as known in the art. The robot controller updates the robot control commands at each control cycle based on the actual robot joint positions $q_{act}$ and the commanded robot motion $q_{cmd}$. This is discussed further below.

Box 150 shows how the robot redundancy discussed previously affects the system of FIG. 1. The motion of the tool center point, $u_{des}$, is an element of the set of real numbers R having a dimension m. The robot joint motion vector, $q_{cmd}$, is an element of the set of real numbers having a dimension n, where n >m. The DOF redundancy is (n−m). Consider the case of a 7-DOF robot performing a 6-DOF task, as discussed earlier. In this case, n=7, m=6, and the redundancy is (7-6)=1 degree of freedom. This single redundant degree of freedom allows the optimization solver some latitude in finding a robot motion solution which efficiently moves the tool center point to the target location, while ensuring collision avoidance and also meeting other robot motion "smoothness" objectives as discussed below.

Box 160 shows the fundamental formulation of the optimization computation used in the dynamic motion optimization module 120. The optimization computation includes an objective function 170 which seeks to minimize a combination of several properties of the commanded robot motion. The objective function 170 is discussed in detail below. The optimization computation also includes at least one inequality constraint 180 which addresses structural/mechanical limitations of the robot. The inequality constraint 180 as shown ensures that robot joint velocities $\dot{q}$ remain below predefined maximum joint velocities $\dot{q}_{max}$ which are predetermined based on robot mechanical limitations. In some embodiments, one or more other inequality constraints (not shown on FIG. 1) may be added which ensure that robot joint accelerations and jerk remain below predefined maximum values which are also based on robot mechanical limitations. An additional inequality constraint may be added (not shown above) which requires that the joint positions q remain within predefined joint position ranges.

A collision avoidance safety constraint 190 is also included in the optimization computations shown in the box 160. The safety constraint 190 is one embodiment of collision avoidance inequality constraint which ensures that the robot does not collide with any obstacles which are present in the robot workspace. The safety constraint 190 employs a model which defines a safety function h(X) based on robot-obstacle minimum distance or a combination of robot-obstacle minimum distance and robot-obstacle relative velocity, where the value of the safety function h(X) is equal to the robot-obstacle minimum distance when the robot and obstacle are moving away from each other, and the value of the safety function h(X) is equal to the minimum distance minus a relative velocity term when the robot and obstacle are moving toward each other. The inequality safety constraint 190 is then defined as $\dot{h}(X) \geq -\gamma h(X)$, as shown on FIG. 1. In simple terms, the safety constraint 190 dictates that the larger the robot-obstacle minimum distance d, the larger the allowable rate of change of distance ($\dot{d}$). The value of the coefficient γ can be established to achieve the desired system behavior, where a smaller value of γ results in more conservative robot behavior (increased maneuvering to provide greater obstacle avoidance distances). The robot-obstacle distance and relative velocity are determined from the obstacle data from the perception module 130 and known robot configuration data.

A complete discussion of the safety constraint 190 and its use in a collision avoidance optimization-based motion planning system was disclosed in U.S. patent application Ser. No. 17/455,676, titled DYNAMIC MOTION PLANNING SYSTEM, filed -19 Nov. 2021 and commonly assigned with the present application, and hereby incorporated by reference in its entirety. Any other suitable type of collision avoidance safety constraint may be employed in the optimization computation of the box 160, including the use of a safety function which is based on robot-obstacle minimum distance only.

Returning to the objective function 170 on FIG. 1, it can be observed to contain three terms—a tool center point tracking term 172, a joint velocity regularization term 174, and a pose regularization term 176. Each of the terms 172, 174 and 176 is a square of a norm of a vector representing a different characteristic of robot motion. The tool center point tracking term 172, computed as $\|u_{des} - J\dot{q}\|^2$, represents the deviation of the commanded joint motions q from the planned tool center point path $u_{des}$, where J is the Jacobian (a derivative of robot configuration). In the absence of any obstacles in the robot workspace, the commanded joint motions q will cause the tool center point to follow the planned path $u_{des}$. However, when an obstacle is present in the workspace, the safety constraint 190 might require that the commanded joint motions q cause the tool center point to deviate from the planned path $u_{des}$ in order to avoid a collision. The tool center point tracking term 172 in the objective function 170 seeks to minimize this deviation. Sometimes, when an obstacle is present in the path of some part of the robot other than the tool, a robot motion plan can be found which does not affect the tool center point path, but rather results in flexing the arms of the robot into a shape that avoids the obstacle. Examples of this are discussed below.

The joint velocity regularization term 174, computed as $\lambda_1 \|\dot{q}\|^2$, represents the overall magnitude of the robot joint velocity vector including all joints in the robot, where $\lambda_1$ is a weighting factor (which is changeable, as discussed later). In general, it is desirable for the rotations of the robot joints to be as small and balanced as possible while moving the tool center point to the target location. The joint velocity regularization term 174 in the objective function 170 seeks to provide this behavior by minimizing the norm of the joint velocity vector.

The pose regularization term 176, computed in one embodiment as $\lambda_2 \|q_{ref} - q\|^2$, represents the deviation of the robot pose (joint position vector) q from a reference pose (reference position vector) $q_{ref}$, where $\lambda_2$ is another weighting factor (which is changeable, as discussed later). As a robot moves from a start location to a target (destination) location, it is desirable for the robot to maintain a consistent pose (overall configuration of joint and arm positions), where each joint angle increments a small amount from one time step (control cycle) to the next. That is, it is undesirable for one or more of the joints to suddenly "flip" to an inverted or opposite position from one step to the next. The pose regularization term 176 in the objective function 170 seeks to provide the desired behavior by minimizing the norm of the difference between the joint position vector and the reference position vector. Other formulations of a pose regularization term are discussed later.

A beneficial feature of the optimization computations shown in the box 160 of FIG. 1 is that the weighting factors $\lambda_1$ and $\lambda_2$ in the objective function 170 can be changed "on the fly" to achieve the desired robot behavior. That is, the values of $\lambda_1$ and $\lambda_2$ can be adaptively set for each control cycle computation of the dynamic motion optimization module 120. For example, when no obstacle is present in the workspace or any obstacle is far from the robot, it is desirable to maintain the preferred robot pose while minimizing path deviation; in this case, the value of $\lambda_2$ may be increased (to emphasize the effect of the pose regularization term 176 in the objective function 170) while the value of $\lambda_1$ is decreased. On the other hand, when an obstacle is close to the robot and collision avoidance maneuvering is likely to be necessary, it may not be possible to maintain the preferred robot pose, in this case, the value of $\lambda_2$ may be decreased (to deemphasize the effect of the pose regularization term 176 in the objective function 170) while the value of $\lambda_1$ is increased. Other factors may be considered in the determination of the values of the weighting factors $\lambda_1$ and $\lambda_2$ in the objective function 170.

Figure 2:
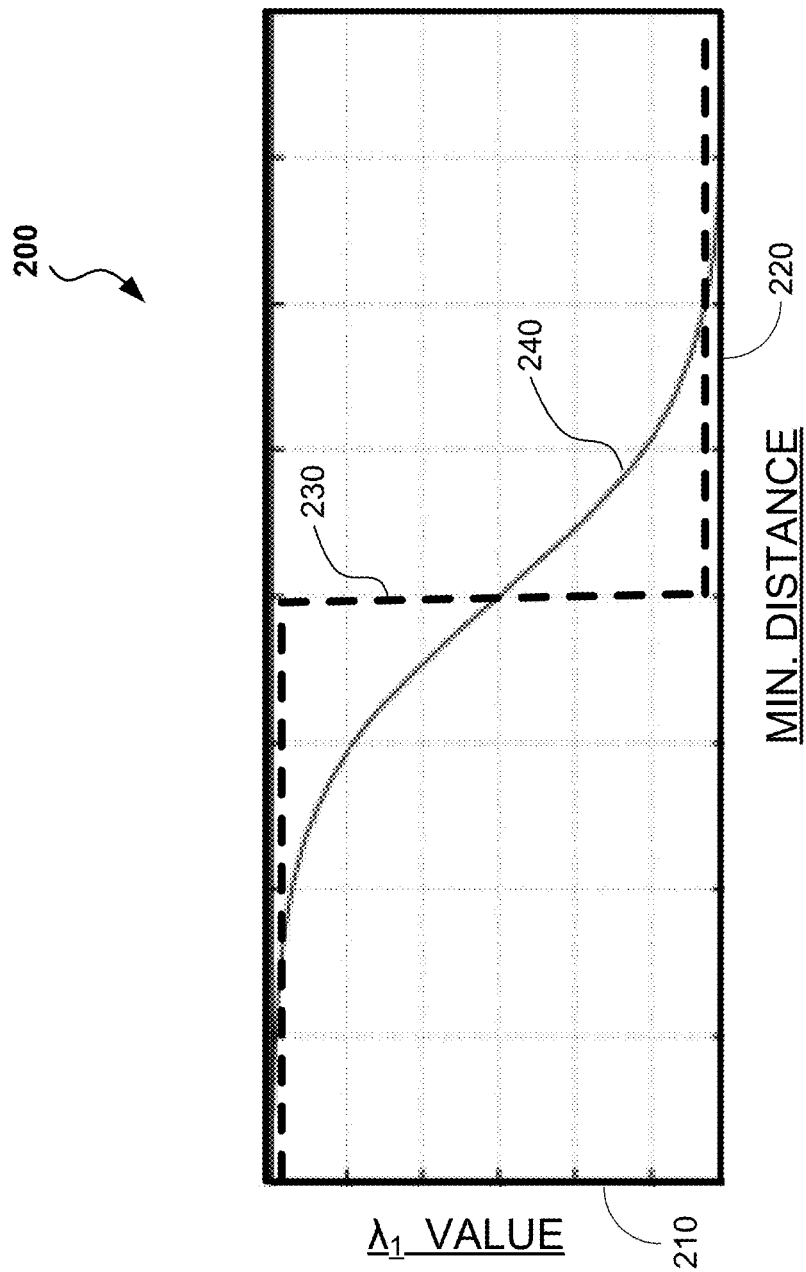
FIG. 2 is a graph showing two different models for adaptive adjustment of the weighting factors $\lambda_1$ and $\lambda_2$ in the objective function used in the dynamic motion optimization module of FIG. 1.

FIG. 2 is a graph 200 showing two different models for adaptive adjustment of the weighting factors $\lambda_1$ and $\lambda_2$ in the objective function 170 used in the dynamic motion optimization module 120 of FIG. 1. The graph 200 plots the value of the weighting factors $\lambda_1$ on a vertical axis 210 versus a minimum robot-obstacle distance on a horizontal axis 220. The axes 210 and 220 are not labelled with specific values, as the values can be adjusted to achieve desired results, using the concepts shown on the graph 200.

A step function curve 230 illustrates a first technique which can be used for adaptively adjusting the weighting factors $\lambda_1$ and $\lambda_2$ in the objective function 170 based on minimum robot-obstacle distance. When the minimum robot-obstacle distance is low (at the left of the graph 200, meaning that evasive collision avoidance maneuvering is likely), $\lambda_1$ is set to a high value (such as 1.0). The corresponding $\lambda_2$ is set to a low value (such as 0.0). This combination of weighting factor values in the objective function 170 causes the optimization computation to converge to a solution which emphasizes velocity regularization while minimizing tracking deviation, and considers pose regularization only slightly if at all.

When the minimum robot-obstacle distance is high—that is, the minimum distance exceeds a threshold such as 0.5 meters (at the right of the graph 200, meaning that evasive collision avoidance maneuvering is not likely), $\lambda_1$ is set to a low value (such as 0.0). The corresponding $\lambda_2$ is set to a high value (such as 1.0). This combination of weighting factor values in the objective function 170 causes the optimization computation to converge to a solution which emphasizes pose regularization while minimizing tracking deviation, and considers velocity regularization only slightly if at all. When no obstacle is detected by the perception system 130, this is treated the same as a high minimum robot-obstacle distance ($\lambda_1$ is set to a low value; $\lambda_2$ is set to a high value). The transition from a high $\lambda_1$ to a low $\lambda_1$ in the step function curve 230 need not be a vertical line; it could be a line with a negative slope, for example.

A continuous curve 240 illustrates a second technique which can be used for adaptively adjusting the weighting factors $\lambda_1$ and $\lambda_2$ in the objective function 170 based on minimum robot-obstacle distance. The continuous curve 240 also sets $\lambda_1$ to a high value when minimum robot-obstacle distance is low, and sets $\lambda_1$ to a low value when minimum robot-obstacle distance is high. However, unlike the step function curve 230, the continuous curve 240 provides a smooth transition from high to low values of $\lambda_1$. The continuous curve 240 could be modeled as an algebraic function (such as a cubic or quintic), or as a trigonometric function (such as a cosine), for example. In some embodiments, after the continuous curve 240 or the step function curve 230 is used to determine the value of $\lambda_1$, the value of $\lambda_2$ may be determined by an equation in which the sum of $\lambda_1$ and $\lambda_2$ is equal to a constant—such that $\lambda_1$ is higher when $\lambda_2$ is lower, and vice versa.

Again, in the graph 200, the mid-graph or threshold distance could be some value other than 0.5 meters, and the maximum and minimum values of the weighting factors $\lambda_1$ and $\lambda_2$ need not be 1.0 and 0.0, respectively. For example, the lowest weighting factor value could be slightly greater than zero (such as 0.1), so that all terms in the objective function 170 are always considered. Also, the maximum weighting factor value could be higher or lower than 1.0, which would affect the balance between the path tracking deviation term 172 and the velocity and pose regularization terms 174 and 176. The exact adaptation model which is used (of the two shown on the graph 200, or others that can be envisioned), along with the values of $\lambda_1$ and $\lambda_2$ and the threshold minimum distance, can be selected to provide the best results in a particular application. In any case, the optimization computation formulation shown in the box 160, with the objective function 170 featuring adaptive weighting at each computation cycle, provides powerful capability for real time collision avoidance motion planning of robots with a redundant degree of freedom.

In the objective function 170, the pose regularization term 176 ($\lambda_2 \|q_{ref} - q\|$) seeks to provide the desired robot behavior by minimizing the norm of the difference between the joint position vector q and the reference position vector $q_{ref}$. This requires that the reference position vector $q_{ref}$ be provided for each step of the robot motion from the start point to the target point.

Figure 3:
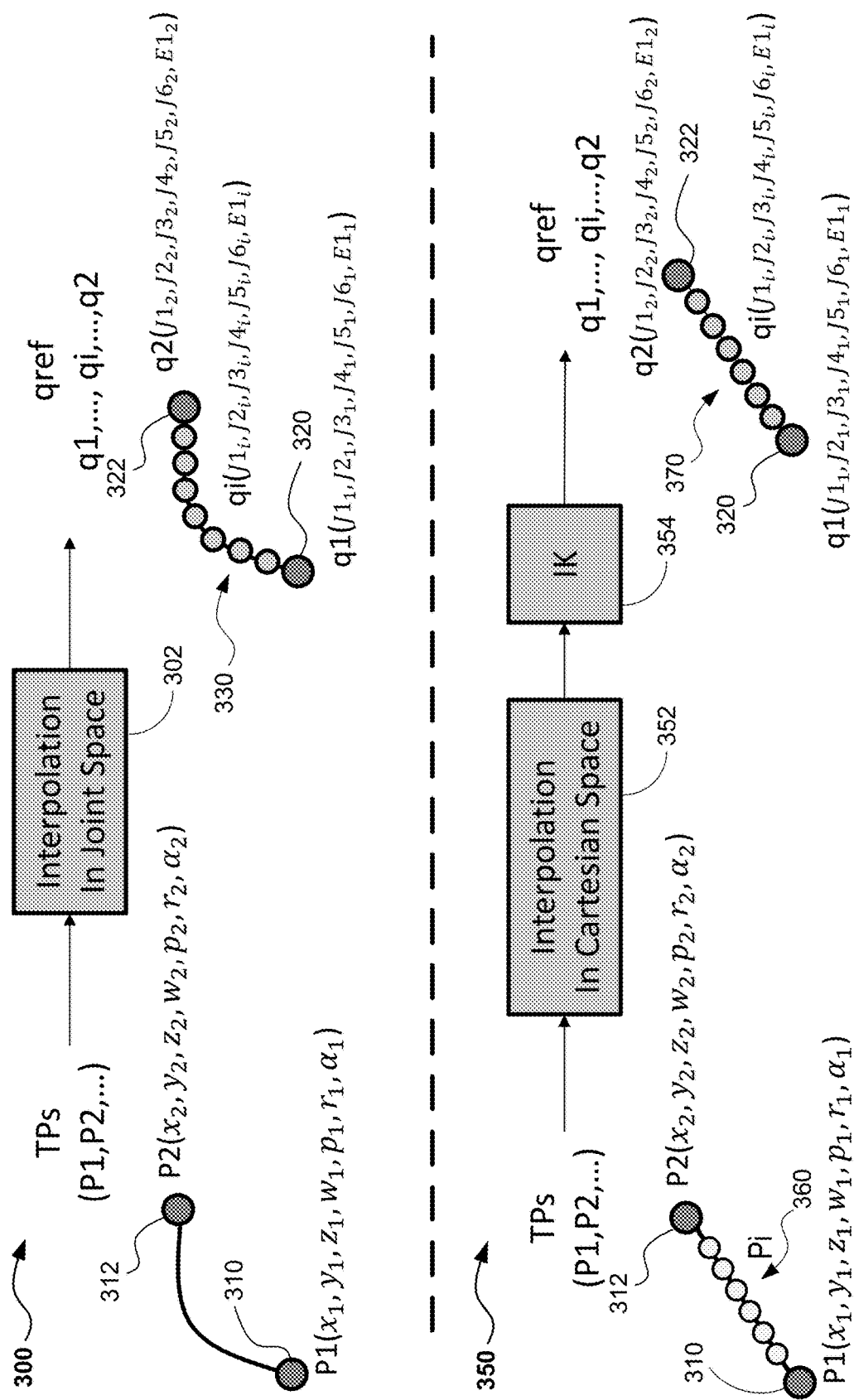
FIG. 3 is an illustration of two different techniques for providing the reference position vector $q_{ref}$ for use in the dynamic motion optimization module of FIG. 1.

FIG. 3 is an illustration of two different techniques for providing the reference position vector $q_{ref}$ for use in the dynamic motion optimization module 120 of FIG. 1. A robot is required to move a tool center point from a start point 310 (or P1) to a target point 312 (or P2). Each of the points 310 and 312 (P1 and P2) is defined in Cartesian space by three positional degrees of freedom (x, y, z), three rotational degrees of freedom (yaw, pitch and roll, or w, p, r), and an extra degree of freedom ($\alpha$). Each of the tool center points 310 and 312 (P1 and P2) in Cartesian space has a corresponding robot position in joint space. A joint position vector 320 (or q1) corresponds to the tool center point 310 (P1), and a joint position vector 322 (or q2) corresponds to the tool center point 310 (P1). Each of the joint position vectors 320 and 322 (q1 and q2) is defined in joint space by six joint position degrees of freedom (J1, ..., J6), and an extra degree of freedom (E1).

FIG. 3 illustrates two different techniques for providing the reference position vector $q_{ref}$ as the robot moves the tool center point from P1 to P2. In a first technique 300 (top half of FIG. 3), the interpolation is done in joint space at box 302. Using the technique 300, the start joint vector q1 is computed from the start tool center point P1, and the target joint vector q2 is computed from the target tool center point P2. Then the interpolation between q1 and q2 is done in joint space, resulting in a set of points q1 (330) in joint space which define a curved path in space between the tool center points P1 and P2. As understood by those skilled in the art, the most efficient robot joint motion to move a tool center from one point to another usually causes the tool center point to follow a curved path. For the technique 300, the reference position vector $q_{ref}$ as the robot moves the tool center point from P1 to P2 is defined by (q1, ..., q1, ..., q2) using the joint vectors q1 (330).

In a second technique 350 (bottom half of FIG. 3), the interpolation is done in Cartesian space at box 352. Using the technique 350, a set of points Pi (360) are first interpolated, at the box 352, between the start tool center point P1 and the target tool center point P2, resulting in a linear path in Cartesian space from P1 to P2. The set of points Pi are then converted to a set of points q1 (370) in joint space using an inverse kinematics (IK) calculation at box 354. For the technique 350, the reference position vector $q_{ref}$ as the robot moves the tool center point from P1 to P2 is defined by (q1, ..., q1, ..., q2) using the joint vectors q1 (370).

In the objective function 170, the pose regularization term 176 ($\lambda_2 \|q_{ref} - q\|$) discussed above seeks to provide the desired robot behavior by minimizing the norm of the difference between the joint position vector q and the reference position vector $q_{ref}$. Following is a discussion of another technique which may be used for pose regularization in the objective function 170 of the optimization computations.

In simple terms, the purpose of the pose regularization term in the objective function is to maintain a consistent overall pose of the robot as it moves the tool from the start point to the target point. The "consistent overall pose" may be described as joint positions and arm positions moving smoothly within a range, avoiding any joint positions and/or arm positions suddenly making a large jump or change from one time step to the next. One simple example of a sudden configuration or pose change, commonly encountered in robot motion planning, is where the wrist joint (at the end of the outer arm) "flips" to an inverted position from one time step to the next in order to put the tool in a desired orientation.

Figure 4A:
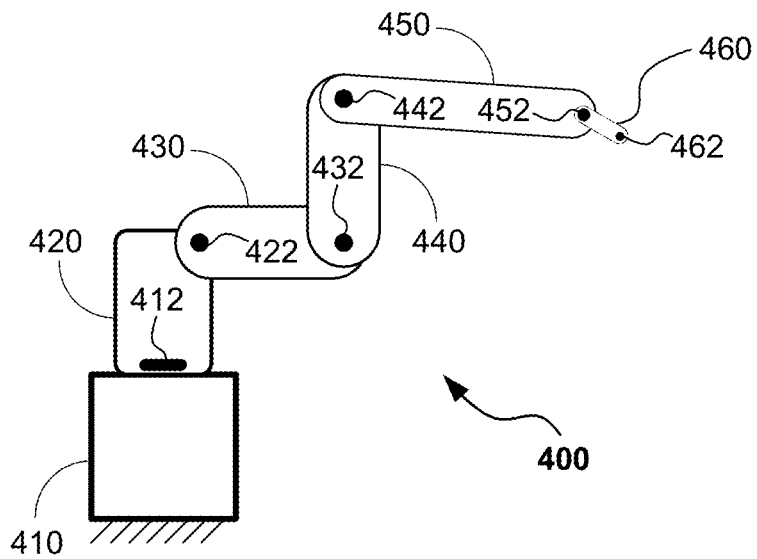
FIGS. 4A and 4B are simplified illustrations of a robot undergoing a pose or configuration change.
Figure 4B:
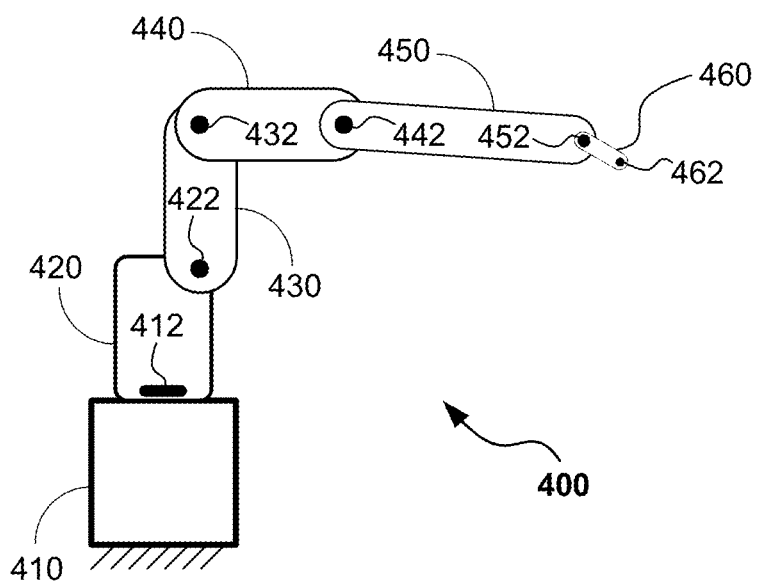

FIGS. 4A and 4B are simplified illustrations of another example of a robot undergoing a pose or configuration change. A robot 400 includes a fixed pedestal 410, a base 420 coupled to the pedestal 410 via a vertical-axis joint 412, an arm 430 coupled to the base 420 via a joint 422, an arm 440 coupled to the arm 430 via a joint 432, an arm 450 coupled to the arm 440 via a joint 442, and a tool 460 coupled to the arm 450 via a joint 452. A tool center point 462 is defined on the tool 460. The robot 400 is simply illustrative, and is drawn to suit the purpose of the present discussion. Other robots may include different numbers of arms and joints, joints which permit axial rotation of one arm relative to another, etc.

In FIG. 4A, the robot 400 is shown in a standard pose or configuration—where the arm 430 is oriented substantially horizontally, and the arm 440 is oriented substantially vertically, resulting in a joint position at the joint 432 of about 90°. The standard pose shown in FIG. 4A may be considered the "down" pose, because the joint 432 is located well below the joint 442.

In FIG. 4B, the robot 400 is shown in an alternate pose or configuration—where the arm 430 is oriented substantially vertically, and the arm 440 is oriented substantially horizontally, resulting in a joint position at the joint 432 of about −90°. The alternate pose shown in FIG. 4B may be considered the "up" pose, because the joint 432 (extra joint in the inner arm) is located well above the joint 422. Even though the tool center point 462 is in exactly the same location in FIGS. 4A and 4B, the robot 400 can take on two very different poses or configurations which result in this tool center point location.

As mentioned above, the purpose of the pose regularization term in the objective function is to maintain a consistent overall pose of the robot as it moves the tool from the start point to the target point. In terms of FIGS. 4A and 4B, it is undesirable for the robot 400 to switch from the "down" pose (FIG. 4A) to the "up" pose (FIG. 4B) in the middle of a tool movement. The pose regularization term in the objective function is designed to prevent this type of pose change mid-motion. One embodiment of pose regularization term (comparing proposed joint positions to $q_{ref}$) was discussed above. Another embodiment of pose regularization term is discussed below.

Consistency of pose may also be achieved by initially computing a destination configuration (the robot pose or configuration when the tool center point is at the target location), and separately evaluating individual joint angles for joints which are prone to significant pose change during the robot task (e.g., wrist joint "flip", or extra inner arm joint "up" vs. "down"). Rather than formulating the pose regularization term in the objective function as discussed earlier ($\lambda_2 \|q_{ref}-q\|^2$), a cost function can be used in a pose regularization term which penalizes any solution with a significant pose change from the destination configuration. One approach to building such a cost function would be to detect a change in sign of the position of any of the joints which are prone to significant pose change. As discussed above with respect to FIGS. 4A and 4B, if the elbow joint has a position angle of about 90° at the destination (target tool center point) configuration, and the optimization computation evaluates a solution vector for a time step which includes the elbow joint at a position angle around −90°, that solution vector would be heavily penalized by the cost function. The change of sign could be detected and penalized in the cost function by using an inner product of the proposed position of a joint with the destination position of the joint.

Yet another type of pose regularization term may be constructed using a cost function which evaluates individual joint positions relative to their position at a destination configuration, but uses the amount of angular change rather than a change of sign. A cost function pose regularization term of this type is shown in Equation (1) below.

$$M \cdot (\|\theta_{d,wrist}-\theta_{wrist}\|+\|+\|\theta_{d,ext-inn}-\theta_{ext-inn}) \qquad (1)$$

where $\theta_{d,wrist}$ is the wrist joint angle at the destination configuration, $\theta_{wrist}$ is the wrist joint angle at the configuration currently being evaluated by the optimization solver, and similarly for the extra inner arm joint, and where M is a number which can be tailored to achieved the desired results, and may be changeable at each control cycle calculation. In other words, Equation (1) will take on a larger value for configurations which have large joint position differences from the destination configuration. When Equation (1) is used as the pose regularization term (instead of $\lambda_2 \|q_{ref}-q\|^2$) in the objective function, the optimization computation will tend to move away from configurations or poses which are significantly different from the destination pose.

Both of the pose regularization formulations discussed above have been shown to provide good results in detailed mathematical simulations of real-time robot motion planning in the presence of obstacles in the workspace. Results are shown in later figures and discussed further below.

Figure 5:
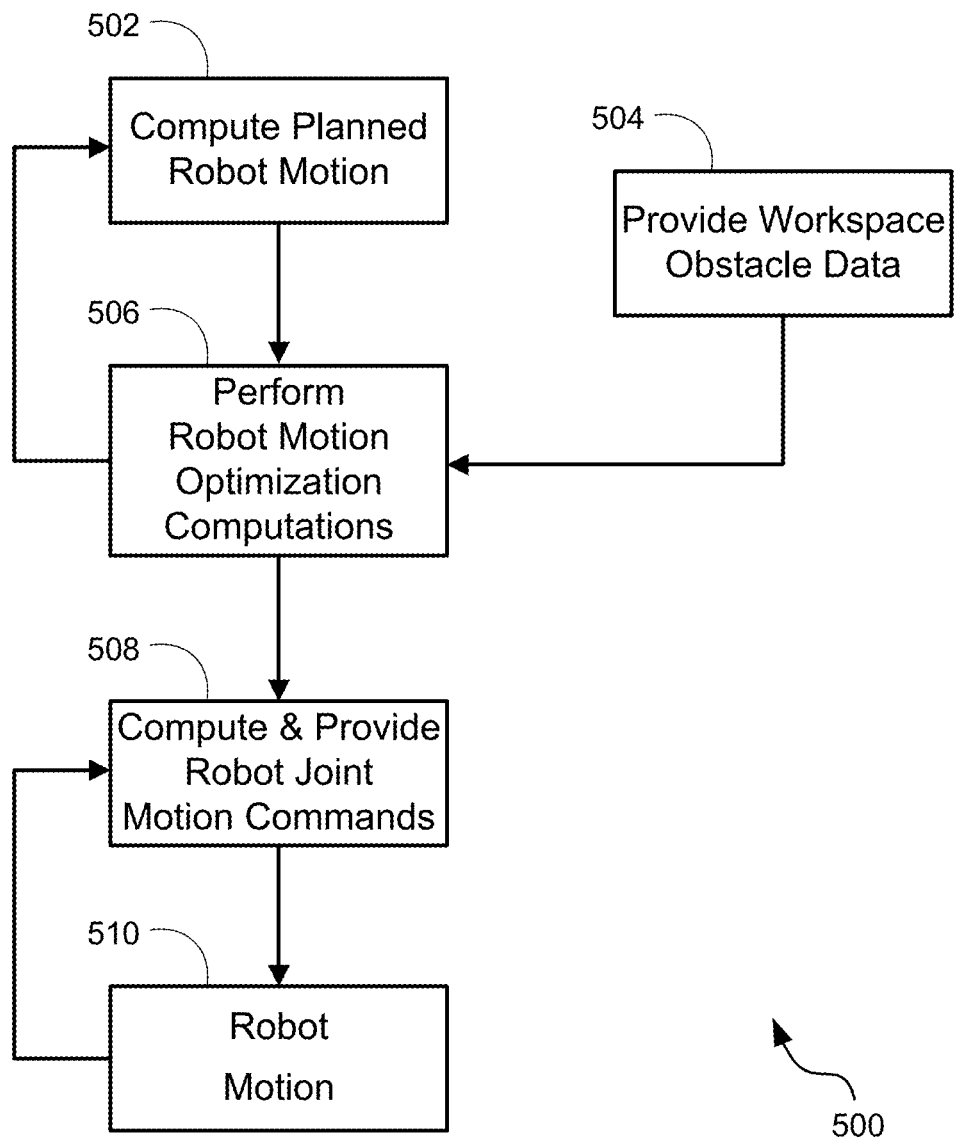
FIG. 5 is a flowchart diagram of a method for dynamic robot motion planning and control for redundant robots, according to an embodiment of the present disclosure.

FIG. 5 is a flowchart diagram 500 of a method for dynamic robot motion planning and control for redundant robots, according to an embodiment of the present disclosure. At box 502, a planned robot motion is computed based on a target or destination tool center point location. In a representative embodiment, the planned robot motion is a tool center point acceleration vector in Cartesian space defining "design" (planned) robot motions $u_{des}$ which move the tool center point to the target location. At box 504, workspace obstacle data is provided by a perception module. The perception module includes at least one camera or sensor, such as a three dimensional (3D) camera, which can detect the location of any obstacles which are present in the workspace. The perception module may include an image processor which computes obstacle location data from the camera images, or the perception module may simply provide raw camera images to a computer or controller which performs robot motion optimization computations. The obstacle location data is preferably computed in a workspace coordinate frame where it can be readily compared to robot position data. Minimum robot-obstacle distance and robot-obstacle relative velocity are ultimately required from the obstacle data.

At box 506, robot motion optimization computations are performed based on the planned robot motion and the obstacle data. The output of the robot motion optimization computations is the commanded robot motion $q_{cmd}$ discussed above with respect to FIG. 1. If no obstacles are present in the workspace, then the commanded robot motion moves the tool center point according to the planned robot motion. The commanded robot motion is provided in a feedback loop to the box 502, where the planned robot motion is recomputed at every control cycle based on the target tool center point location and the commanded robot motion (which may have been modified during optimization to avoid any obstacles).

At box 508, a robot controller provides the commanded robot motion to a robot. The robot controller may perform computations or transformations in order to provide suitable robot joint motion commands to the robot. At box 510, the robot actually moves based on the joint motion commands from the controller. The robot and controller operate as a closed loop feedback control system, where the actual robot state $q_{act}$ (joint positions and velocities) is fed back to the controller for computation of updated joint commands. The robot and controller operate on a control cycle having a designated time period (i.e., a certain number of milliseconds).

In the box 506, the motion optimization problem can be formulated as:

$$\min_{q} \|u_{des} - J\dot{q}\|^2 + \lambda_1 \|\dot{q}\|^2 + \lambda_2 \|q_{ref} - q\|^2 \quad (2)$$

Such that;

$$\|\dot{q}\| \leq \dot{q}_{max} \quad (3)$$

$$\dot{h}(X) \geq -\gamma h(X) \quad (4)$$

where Equation (2) is the optimization objective function 170 to be minimized (discussed earlier with respect to FIG. 1—including a tool center point tracking term, a joint velocity regularization term, and a pose regularization term), and Equations (3)-(4) are inequality constraints which must be met during the iterative optimization computation. In Equation (3), $\dot{q}$ are the joint velocities for all joints in the robot, and $\dot{q}_{max}$ are predefined maximum joint velocities based on robot mechanical limitations. Other inequality constraint (not shown above) may be added, similar to Equation (3), but for joint accelerations and jerk rather than velocities. An additional inequality constraint may be added (not shown above) which requires that the joint positions q remain within predefined joint position ranges.

The pose regularization term ($\lambda_2 \|q_{ref} - q\|^2$) shown in Equation (2) may be replaced by the cost function pose regularization term of the type shown in Equation (1) and discussed earlier.

For the obstacle avoidance constraint (Equation (4)), the goal is to keep the safety function $h(X) \geq 0$, as discussed above with respect to FIG. 1. The obstacle avoidance constraint (Equation (4)) and the formulation of the safety function h(X) are described in detail in the incorporated application Ser. No. 17/455,676 discussed above. A different safety function, based on robot-obstacle minimum distance only, may also be used as discussed earlier.

The optimization computations using Equations (2)-(4) are performed at each robot control cycle. Upon convergence, the optimization computations yield the commanded robot motion $q_{cmd}$ which represents the robot motion having the minimum combination of objective function terms (tracking deviation, velocity regularization, and pose regularization) while satisfying the inequality constraints. The weighting factor coefficients on the regularization terms of the objective function ($\lambda_1$ and $\lambda_2$ or M) may be adjusted for each optimization computation (each control cycle) based on workspace obstacle conditions, as discussed earlier.

In FIG. 5, the computation of the planned robot motion at the box 502, the robot motion optimization computations at the box 506 and the computation of robot joint motion commands at the box 508 may all be performed on a robot controller which is in real-time communication with the robot. Alternately, the computations of the boxes 502 and 506 may be performed on a separate computer and the commanded robot motion for each control cycle provided to the controller at the box 508. These two alternate hardware implementations are shown in the following two figures and discussed below.

Figure 6:
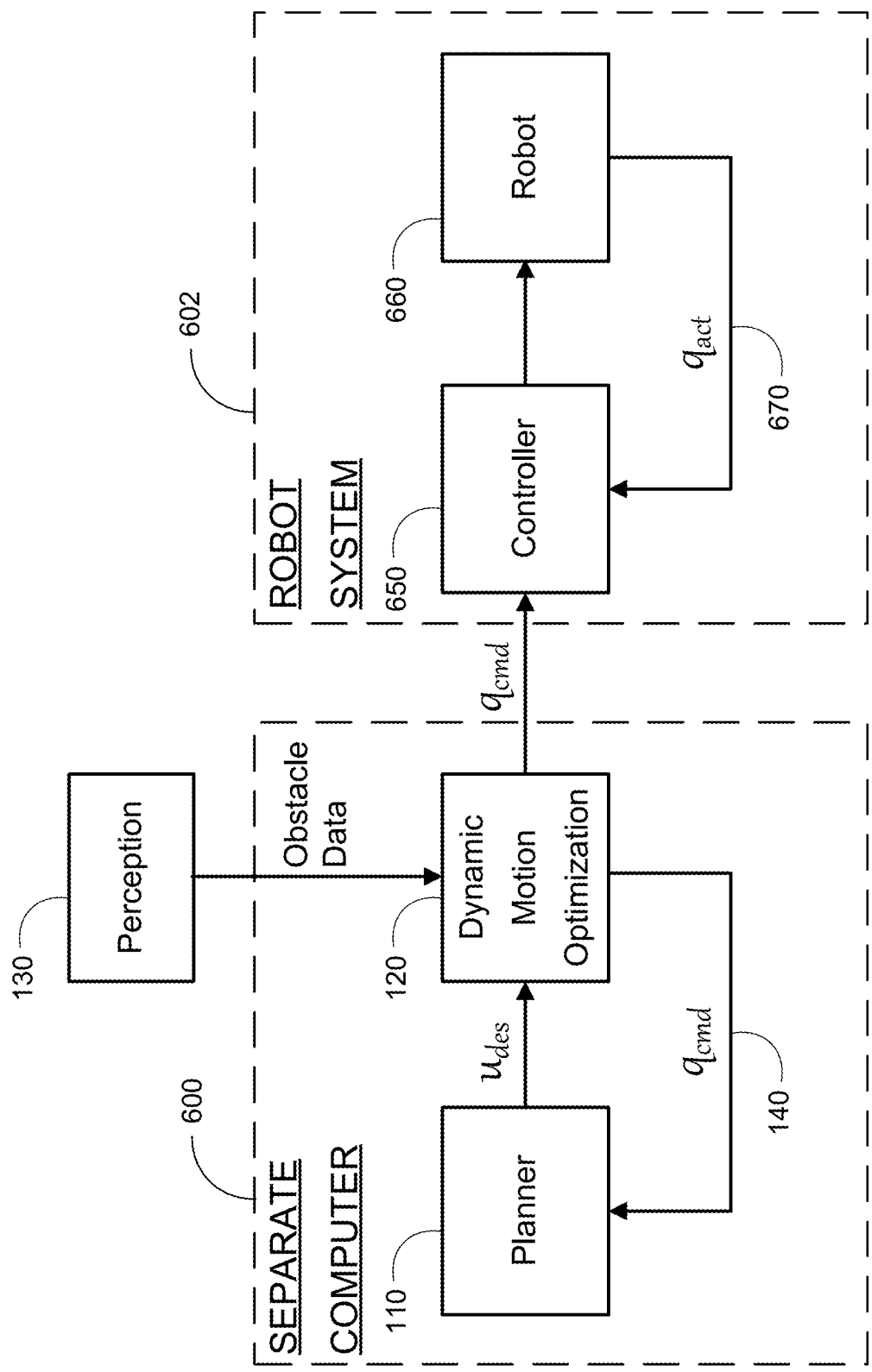
FIG. 6 is a block diagram illustration of a dynamic motion planning system and controller for a redundant robot, including collision avoidance in the motion planning, according to a first embodiment of the present disclosure.

FIG. 6 is a block diagram illustration of a dynamic motion planning system and controller for a redundant robot, including collision avoidance in the motion planning, according to a first embodiment of the present disclosure. In this embodiment, a separate computer 600, including a processor and memory, performs all of the computations in the planner module 110 and the dynamic motion optimization module 120 of FIG. 1. The perception module 130 is in communication with the separate computer 600, and provides obstacle data in the form of camera images and/or sensor data to the separate computer 600 for use in the dynamic motion optimization module 120.

The separate computer 600 communicates with a robot system 602, including a robot controller 650 and a robot 660. Specifically, the commanded robot motion $q_{cmd}$ is provided from the dynamic motion optimization module 120 to the controller 650. The controller 650 controls the motion of the robot 660 in a real-time control system operating on a defined control cycle (a certain number of milliseconds), with actual robot state $q_{act}$ (joint positions and velocities) provided back to the controller 650 on a feedback loop 670. In the system of FIG. 6, the separate computer 600 could be a dedicated computer specifically for the robot system 600, or the separate computer 600 could perform motion optimization computations for multiple robot systems.

Figure 7:
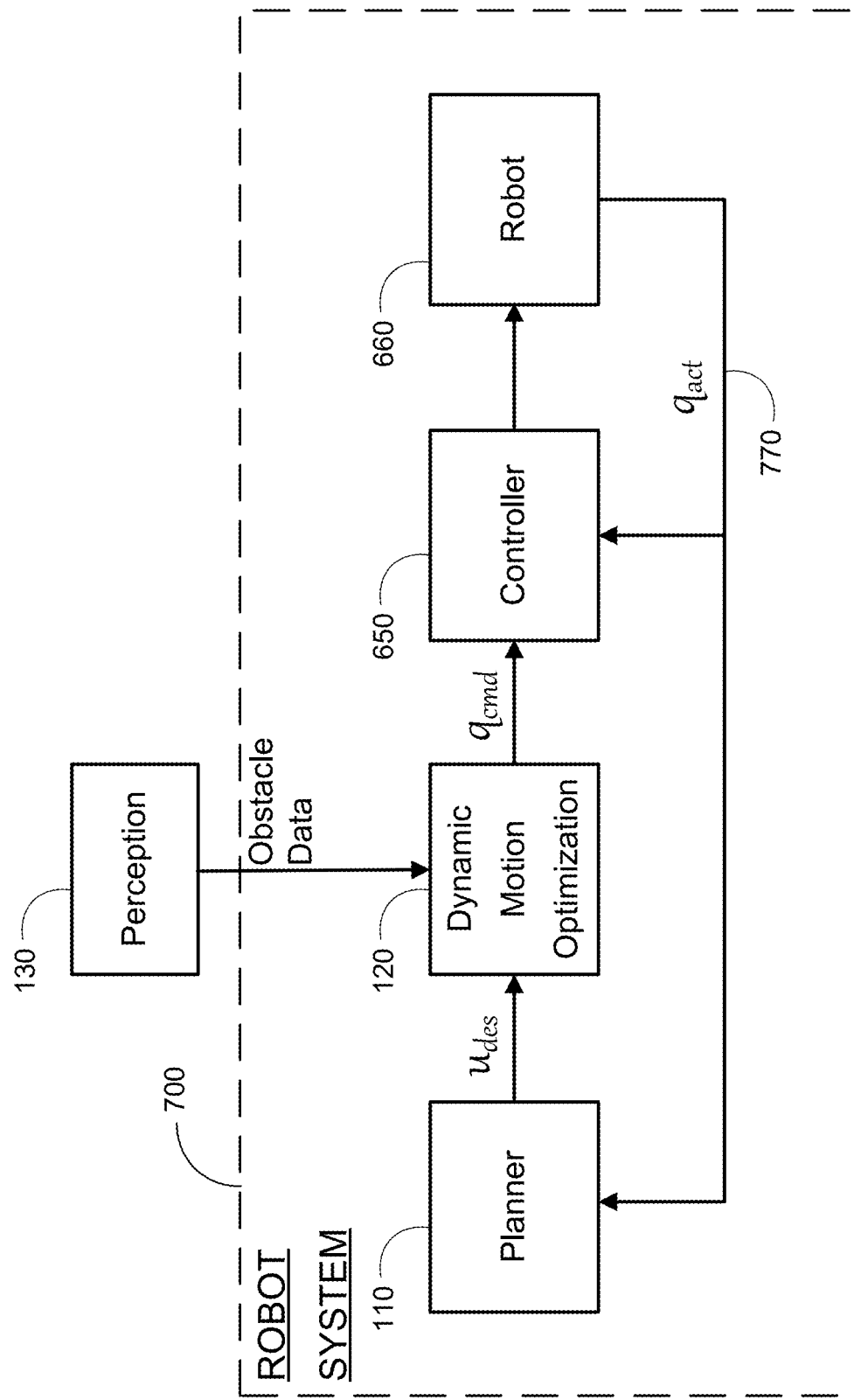
FIG. 7 is a block diagram illustration of a dynamic motion planning system and controller for a redundant robot, including collision avoidance in the motion planning, according to a second embodiment of the present disclosure.

FIG. 7 is a block diagram illustration of a dynamic motion planning system and controller for a redundant robot, including collision avoidance in the motion planning, according to a second embodiment of the present disclosure. In this embodiment, there is no separate computer; rather, all of the motion optimization computations and control of the redundant robot are self-contained in a robot system 700 itself. That is, the computations in the planner module 110, the dynamic motion optimization module 120 and the robot controller module 650 are all performed on a traditional robot controller (having a processor and memory) in communication with the robot 660. The perception module 130 provides obstacle data in the form of camera images and/or sensor data to the robot system 700 for use in the dynamic motion optimization module 120. The controller module 650 controls the motion of the robot 660 in a real-time control system operating on a defined control cycle, with actual robot state $q_{act}$ (joint positions and velocities) provided back to the controller module 650 and to the planner module 110 on a feedback loop 770.

The system of FIG. 7, with all robot motion planning, optimization and control computations performed on the robot controller, offers the advantage of avoiding the use of the separate computer 600. On the other hand, the system of FIG. 6 allows the optimization computations to be performed on a separate processor, decoupled from the real-time robot controller, which offers the advantage of faster motion optimization computations. In either hardware implementation, the motion optimization computations—ensuring collision avoidance from any dynamic obstacles, and providing optimal motion characteristics of the redundant robot—must be performed for each robot feedback control cycle, based on robot configuration and obstacle data at the time.

The dynamic motion planning techniques of FIGS. 1-7 have been demonstrated to produce reliable motion planning results including obstacle avoidance in simulated robot systems having a redundant degree of freedom. This includes effective motion planning to avoid any obstacles in the workspace while minimizing path deviation and maintaining desired joint velocities and robot pose, and rapid computation of the safety function and the resulting motion optimization.

Figure 8:
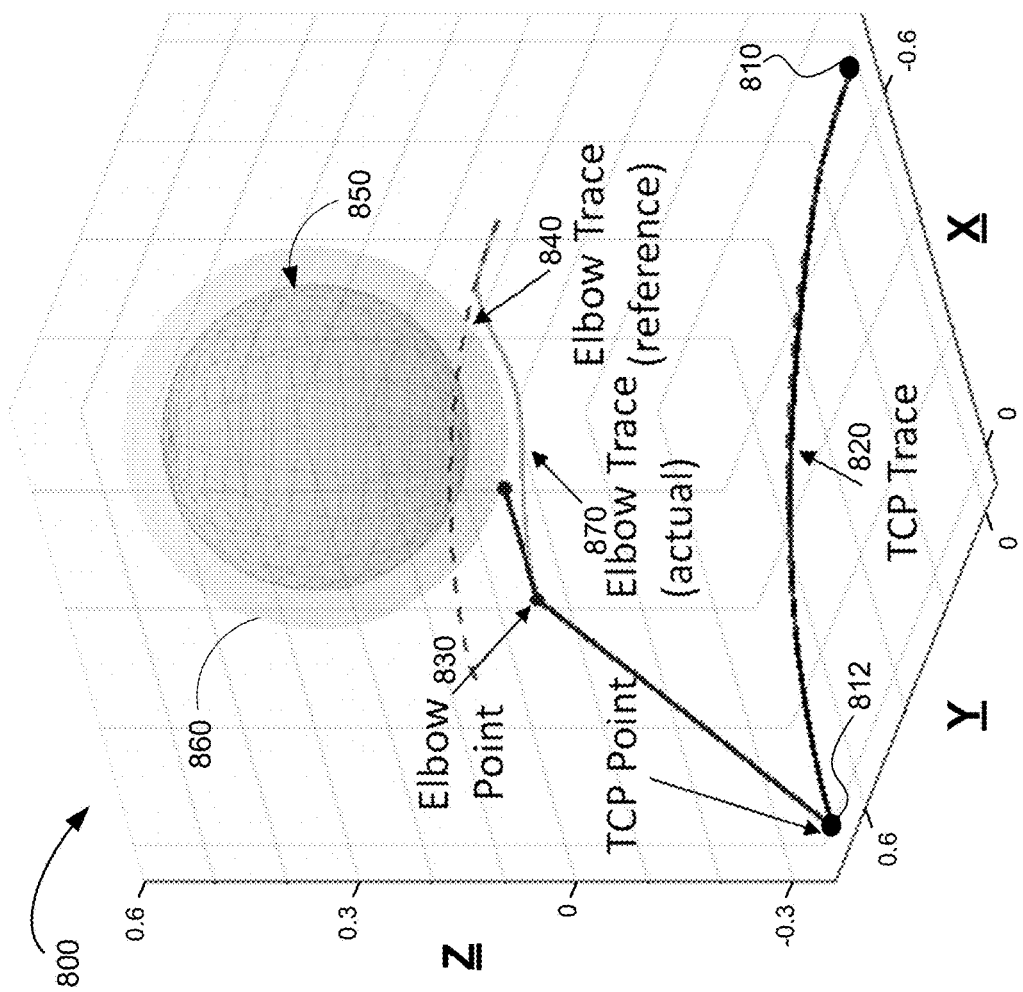
FIG. 8 is a graph of a robot tool center point path in three-dimensional space, along with robot elbow joint trace modifications needed to avoid a static obstacle in the workspace, according to an embodiment of the present disclosure.

FIG. 8 is a graph of a robot tool center point path in three-dimensional space, along with robot elbow joint path modifications needed to avoid a static obstacle in the workspace, according to an embodiment of the present disclosure. A workspace 800 is represented in 3D space by orthogonal X, Y and Z axes as shown. A robot (not shown) operates in the workspace 800 and is required to perform a task which involves moving a tool center point from a start point 810 to a target (destination) point 812. The tool center point follows a TCP trace 820 from the start point 810 to the destination point 812. FIG. 8 represents data collected from simulations of a particular robot and controller, using the dynamic path planning techniques for redundant robots of the present disclosure.

In addition to the tool center point, a robot elbow joint point 830 is shown on FIG. 8. Two scenarios of robot motion (elbow joint motion) are depicted in FIG. 8. In a first scenario, no obstacles are present in the workspace 800. In the absence of any obstacles, the robot will move the tool center point from the start point 810 to the target point 812 along the TCP trace 820, while the elbow joint point 830 moves along an elbow reference trace 840.

In a second scenario, a fixed spherical obstacle 850 is placed in the workspace 800 in a location obstructing the elbow reference trace 840. A buffer zone 860 defines a safe distance margin around the obstacle 850, such that all parts of the robot should remain outside of the buffer zone 860. The second scenario simulation was run with the obstacle 850, using the same tool center start point 810 and target point 812. The dynamic path planning techniques of the present disclosure were used to compute an obstacle avoidance robot motion plan. Because of the tracking deviation term in the objective function, the tool center point follows essentially exactly the same TCP trace 820 when the obstacle 850 is in the workspace as when no obstacle is present. However, with the obstacle 850 present, the elbow joint point 830 follows a much different path—shown as an actual elbow trace 870. The elbow trace 870 causes the elbow joint point 830 and the inner robot arm to remain outside of the buffer zone 860, while the robot still moves the tool center point along the desired path. These simulation results confirm the behavior that is expected from the dynamic motion planning computations described above—satisfying the collision avoidance safety constraint, while converging to a solution with virtually no tool center point path deviation.

Figure 9A:
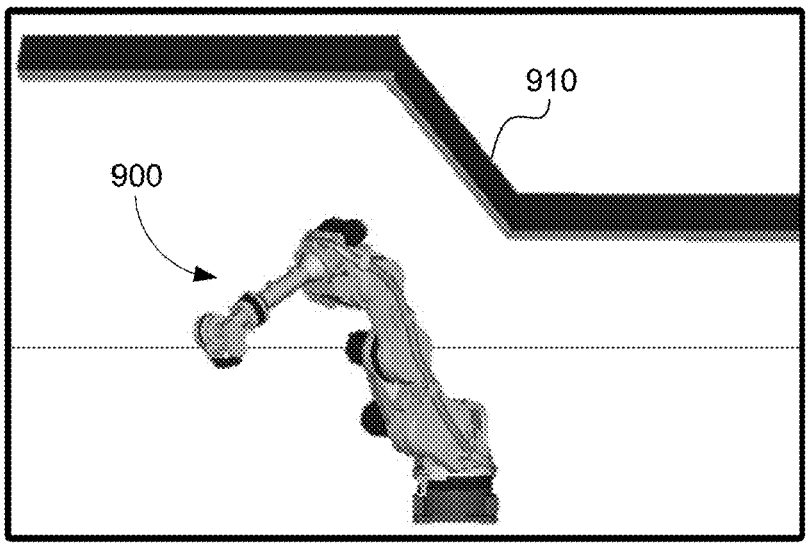
FIGS. 9A, 9B and 9C are illustrations of a robot in a workspace with a fixed overhead obstruction, including motion planning results with and without the techniques of the present disclosure.
Figure 9B:
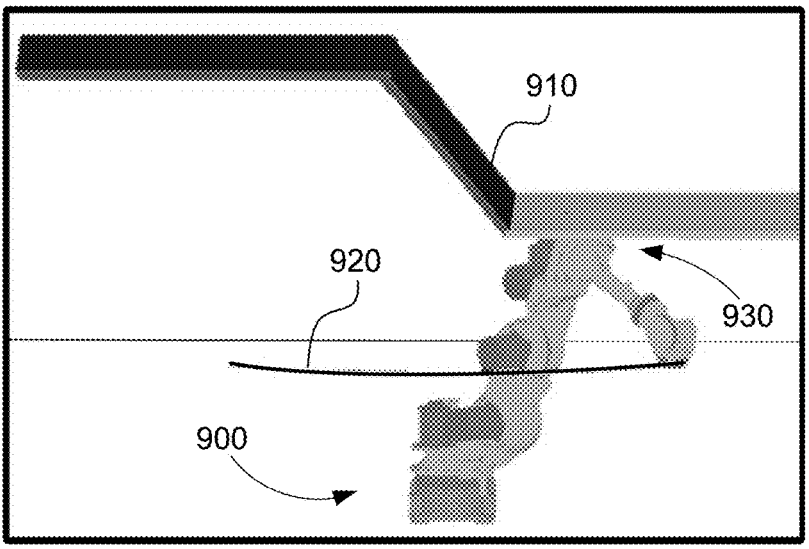
Figure 9C:
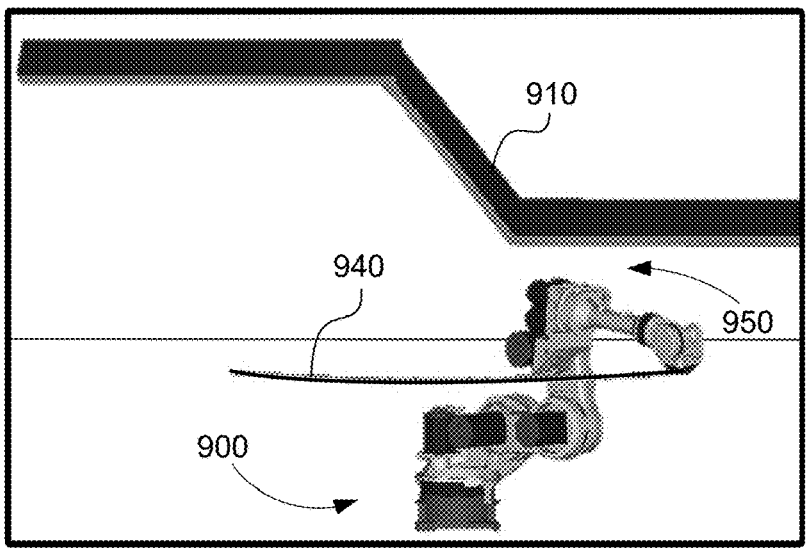

FIGS. 9A, 9B and 9C are illustrations of a robot in a workspace with a fixed overhead obstruction, including motion planning results with and without the techniques of the present disclosure. FIGS. 9A-9C illustrate another example of collision avoidance from a static obstacle by a redundant robot.

A robot 900 operates in a workspace having a fixed overhead obstruction 910—illustrated as a ceiling which angles downward to a lower height at the right side of the workspace. The robot 900 is required to perform a task which involves moving a tool from a start point to a target (destination) point. The robot 900 is illustrated in the start point configuration in FIG. 9A.

FIG. 9B shows the robot 900 in the destination point configuration, and represents data from a simulation of the robot and controller using a conventional path planning technique for redundant robots, which cannot consider collision avoidance of any part of the robot other than the tool center point. In FIG. 9B, the robot 900 has moved the tool center point along a tool center point trace 920 as instructed, from the start point to the destination point. However, the elbow joint of the robot 900 has collided with the overhead obstruction 910 in the lower portion of the ceiling, as indicated at 930. This is obviously not an acceptable robot motion, and illustrates the limitations of conventional path planning for redundant robots which can only consider tool center point obstacle collisions.

FIG. 9C shows the robot 900 in the destination point configuration, and represents data from a simulation of the robot and controller using the dynamic path planning techniques for redundant robots of the present disclosure, including collision avoidance and motion characteristic quality in an optimization computation. In FIG. 9C, the robot 900 has moved the tool center point along a trace 940 which is virtually the same as the trace 920. However, the robot 900 has articulated several of the arm joints to lower the elbow joint location, such that the elbow joint has sufficient clearance from the overhead obstruction 910 in the lower portion of the ceiling, as indicated at 950. This is obviously a much better robot motion than shown in FIG. 9B, and illustrates the capabilities of the motion planning techniques of the present disclosure—which use the redundant degree of freedom of the robot to provide a desired tool path while also ensuring collision-free robot motion.

Figure 10A:
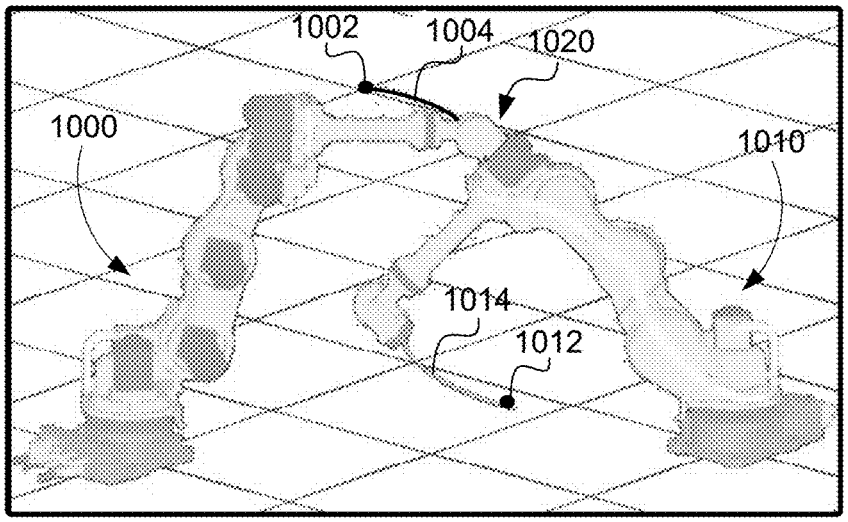
FIGS. 10A, 10B and 10C are illustrations of two robots operating in tandem in a workspace, including motion planning results with and without the techniques of the present disclosure.
Figure 10B:
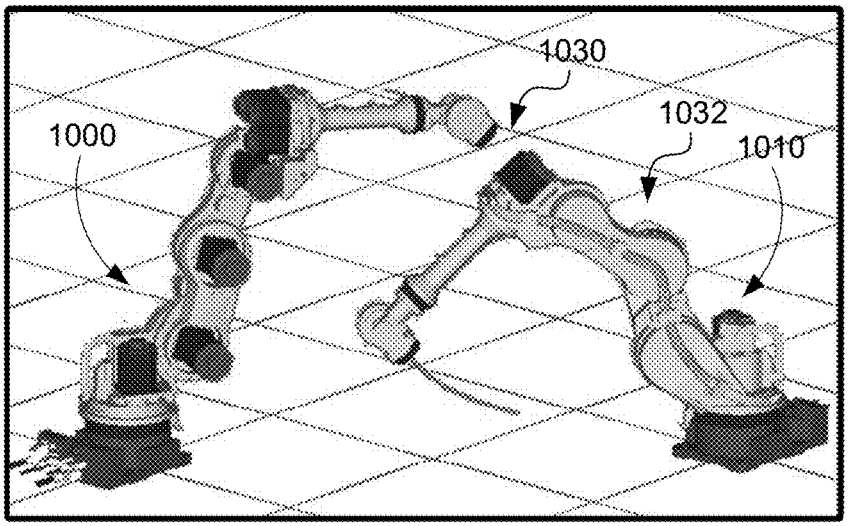
Figure 10C:
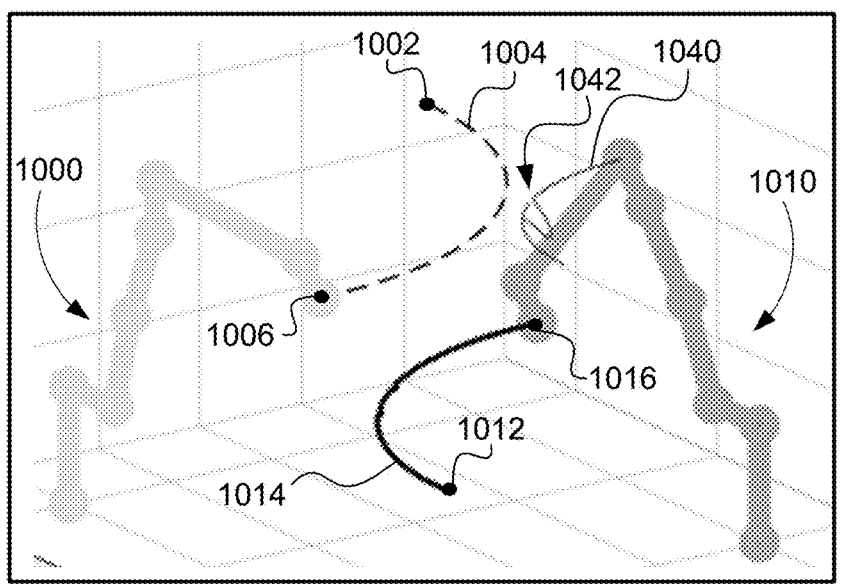

FIGS. 10A, 10B and 10C are illustrations of two robots operating in tandem in a workspace, including motion planning results with and without the techniques of the present disclosure. FIGS. 10A-10C illustrate an example of collision avoidance from dynamic obstacles by redundant robots. In this case, each robot represents a potential obstacle to the motion of the other robot.

A robot 1000 and a robot 1010 operate in the workspace, where each of the robots 1000 and 1010 is required to perform a task at the same time. The robot 1000 is required to perform a task which involves moving a tool from a start point 1002 to a target (destination) point (not shown). The tool center point for the robot 1000 follows a trace 1004 from the start point to the destination point. The robot 1010 is required to perform a task which involves moving a tool from a start point 1012 to a target (destination) point (not shown). The tool center point for the robot 1010 follows a trace 1014 from the start point to the destination point. The tool center point traces 1004 and 1014 are shown in their entirety in FIG. 10C, discussed below.

FIG. 10A illustrates motions of the robots 1000 and 1010 which were planned with conventional methods not including dynamic object collision avoidance. In FIG. 10A, the robots 1000 and 1010 are illustrated in a configuration roughly midway through the motion of the task they are performing. In this configuration, the tool of the robot 1000 collides with the elbow joint of the robot 1010, as indicated at arrow 1020. A collision of any kind is obviously not an acceptable result.

FIG. 10B illustrates motions of the robots 1000 and 1010 which were planned using the dynamic path planning techniques for redundant robots of the present disclosure, including collision avoidance and motion characteristic quality in an optimization computation. In FIG. 10B, the robots 1000 and 1010 are again illustrated in a configuration roughly midway through the motion of the task they are performing. In this instance, however, the tool of the robot 1000 does not collide with the elbow joint of the robot 1010, with the clearance indicated at arrow 1030. This clearance is possible because the robot 1010 flexed its inner-arm extra joint as shown at arrow 1032, resulting in the elbow joint being pulled inward toward the robot base slightly.

FIG. 10C includes stick-figure illustrations of the robots 1000 and 1010 in their final configuration, with the tool of the robot 1000 positioned at a destination point 1006 at the end of the tool center point trace 1004, and the tool of the robot 1010 positioned at a destination point 1016 at the end of the tool center point trace 1014. Also shown in FIG. 10C is an elbow joint trace 1040 for the robot 1010 for the motion planned with conventional techniques (FIG. 10A). For the motion planned with the techniques of the present disclosure (FIG. 10B), the elbow joint of the robot 1010 follows the same trace 1040 except for an area indicated at arrow 1042. As shown at the arrow 1042, the elbow joint of the robot 1010 dips downward and inward mid-path in order to create the clearance shown in FIG. 10B, thus avoiding a collision.

It is noteworthy that the techniques of the present disclosure avoid a robot-robot collision without causing a deviation in the tool center point paths of either the robot 1000 or the robot 1010. This is made possible by the redundant degree of freedom of the robots along with the motion optimization computations discussed above—with the weighted objective function which can seek a solution which minimizes tool path deviation while also meeting the collision avoidance constraint.

Other simulations of a two-robot workspace (similar to FIGS. 10A-10C) were also performed, where the pose regularization term of the objective function was deactivated in one simulation, activated using the reference-pose-based pose regularization formulation ($\lambda_2 \|q_{ref}-q\|$) in a second simulation, and activated using the cost function pose regularization formulation (Equation (1) discussed earlier) in a third simulation. These simulations confirmed that the objective function with adaptive weighting and either of the proposed pose regularization terms is effective in causing the robots to maintain a preferred pose throughout their motion while avoiding collisions.

The results shown in FIGS. 8-10 and discussed above illustrate the effectiveness of the disclosed motion planning techniques for redundant robots, including collision avoidance with static and dynamic obstacles, adherence to a prescribed tool center point path, and preferable robot motion characteristics (joint velocities and robot poses).

In addition, the commanded motion computation time for each control cycle (the time to provide an output from the dynamic motion optimization module 120) was measured to have an average of less than one millisecond (ms) for the disclosed techniques. Using a typical robot control cycle of 8 ms, the techniques of the present disclosure perform motion planning computations more than fast enough, while providing far superior collision avoidance and motion smoothness results compared to prior art motion computation methods.

Throughout the preceding discussion, various computers and controllers are described and implied. It is to be understood that the software applications and modules of these computer and controllers are executed on one or more electronic computing devices having a processor and a memory module. In particular, this includes a processor in each of the robot controller 650 and the optional separate computer 600 of FIGS. 6 and 7 discussed above. Specifically, the processor in the controller 650 and/or the separate computer 600 are configured to perform the redundant robot collision avoidance motion planning functions of the box 506 of FIG. 5 (and shown on FIG. 1), along with the robot feedback motion control function of the box 508.

While a number of exemplary aspects and embodiments of the methods and systems for dynamic motion planning and control for redundant robots have been discussed above, those of skill in the art will recognize modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for dynamic motion planning for a robot, said method executed on a computing device and comprising:
   computing a design robot motion based on a target location of a robot tool center point,
   computing a commanded robot motion for a current control cycle of calculated motion for the robot based on the design robot motion and obstacle data received from sensors, where the commanded robot motion is provided as feedback for computing the design robot motion for a next control cycle, and where computing a commanded robot motion includes an optimization computation having a multi-term objective function, one or more robot structural limitation constraints and a collision avoidance constraint, where the multi-term objective function includes a path deviation minimization term, a joint velocity regularization term and a robot pose regularization term, and the objective function seeks a minimum of a sum of the terms; and
   providing the commanded robot motion to a controller module which sends signals executing control of joint motions of the robot.

2. The method according to claim 1 wherein the computing device is a robot controller which executes computing the design robot motion and computing the commanded robot motion, as well as controlling the joint motions of the robot.

3. The method according to claim 1 wherein the computing device includes a computer which executes computing the design robot motion and computing the commanded robot motion, and the computer provides the commanded robot motion to a robot controller which controls the joint motions of the robot.

4. The method according to claim 1 wherein coefficients on the terms of the objective function are adjustable at each control cycle based on proximity of the robot to any obstacles in a robot workspace.

5. The method according to claim 1 wherein the joint velocity regularization term includes a square of a norm of a joint velocity vector including all joints in the robot.

6. The method according to claim 1 wherein the robot pose regularization term includes a square of a norm of a vector defined by a difference between a joint position and a reference joint position for all joints in the robot.

7. The method according to claim 1 wherein the robot pose regularization term is a cost function including a norm of a vector defined by a difference between a joint position and a destination joint position for one or more joints in the robot which are predetermined as being susceptible to significant pose change from one control cycle to the next during a robot motion.

8. The method according to claim 1 wherein the one or more robot structural limitation constraints include inequality constraints defining one or more of: maintaining robot joint positions within predefined joint position ranges, maintaining robot joint velocities below predefined joint velocity limits, and maintaining robot joint accelerations below predefined joint acceleration limits.

9. The method according to claim 1 wherein the collision avoidance constraint is an inequality constraint computed from a safety function, where the collision avoidance constraint is that a rate of change of the safety function must be greater than or equal to the negative of the safety function multiplied by a coefficient.

10. The method according to claim 9 wherein the safety function is either equal to a robot-obstacle minimum distance, or the safety function is equal to the robot-obstacle minimum distance reduced by a term computed from a robot-obstacle relative velocity.

11. The method according to claim 1 wherein the target location is a moving target location defined as a function of time.

12. The method according to claim 1 wherein the design robot motion is a tool center point motion in Cartesian space, and the commanded robot motion includes robot joint rotational motions for all joints in the robot.

13. The method according to claim 12 wherein the robot has at least one redundant degree of freedom, where a number of degrees of freedom of the robot joint rotational motions exceeds a number of degrees of freedom of the tool center point motion.

14. A method for dynamic motion planning for a robot, said method executed on a computing device and comprising:
computing a design robot motion based on a target location of a robot tool center point,
computing a commanded robot motion for a current control cycle of calculated motion for the robot based on the design robot motion and obstacle data received from sensors, where the commanded robot motion is provided as feedback for computing the design robot motion for a next control cycle, and where computing a commanded robot motion includes an optimization computation having a multi-term objective function with coefficients being adjustable at each control cycle, position, velocity and acceleration limitations for one or more robot joints defined as inequality constraints, and a collision avoidance constraint; and
providing the commanded robot motion to a controller module which sends signals control of joint motions of the robot,
where the design robot motion is a tool center point motion in Cartesian space, and the commanded robot motion includes robot joint rotational motions for all joints in the robot, and the robot has at least one redundant degree of freedom such that a number of degrees of freedom of the robot joint rotational motions exceeds a number of degrees of freedom of the tool center point motion.

15. The method according to claim 14 wherein the multi-term objective function includes a path deviation minimization term, a joint velocity regularization term and a robot pose regularization term, and the objective function seeks a minimum of a sum of the terms, and where the coefficients on the terms of the objective function are adjustable at each control cycle based on proximity of the robot to any obstacles in a robot workspace.

16. A dynamic motion planning system for an industrial robot, said system comprising:
a perception module including at least one sensor or camera configured to detect obstacles in a workspace of the robot; and
a computing device having a processor and memory, configured with:
a planning module programmed to compute a design robot motion based on a target location of a tool center point on a tool attached to the robot; and
a motion optimization module receiving obstacle data from the perception module, said motion optimization module being programmed to compute a commanded robot motion for a current control cycle of calculated motion for the robot based on the design robot motion and the obstacle data, where the commanded robot motion is provided as feedback to the planning module for computing the design robot motion for a next control cycle, and where the commanded robot motion is computed using an iterative optimization computation having a variably-weighted multi-term objective function, one or more robot structural limitation constraints and a collision avoidance constraint, where the multi-term objective function includes a path deviation minimization term, a joint velocity regularization term and a robot pose regularization term, and the objective function seeks a minimum of a sum of the terms,
and where the commanded robot motion is provided to a controller module which sends signals executing control of joint motions of the robot.

17. The system according to claim 16 wherein the computing device is a robot controller which executes the planning module, the motion optimization module and the controller module, and provides robot joint motion commands to the robot.

18. The system according to claim 16 wherein the computing device executes the planning module and the motion optimization module, and a robot controller is in communication with the computing device, where the robot controller executes the controller module and provides the robot joint motion commands to the robot.

19. The system according to claim 16 wherein the coefficients on the terms of the objective function are adjustable at each control cycle based on proximity of the robot to any obstacles in a robot workspace.

20. The system according to claim 16 wherein the robot pose regularization term is selected from a first formulation which includes a square of a norm of a vector defined by a difference between a joint position and a reference joint position for all joints in the robot, or a second formulation which is a cost function including a norm of a vector defined by a difference between a joint position and a destination joint position for one or more joints in the robot which are predetermined as being susceptible to significant pose change from one control cycle to the next during a robot motion.

21. The system according to claim 16 wherein the one or more robot structural limitation constraints include inequality constraints defining one or more of: maintaining robot joint positions within predefined joint position ranges, maintaining robot joint velocities below predefined joint velocity limits, and maintaining robot joint accelerations below predefined joint acceleration limits.

22. The system according to claim 16 wherein the collision avoidance constraint is an inequality constraint computed from a safety function, where the collision avoidance constraint is that a rate of change of the safety function must be greater than or equal to the negative of the safety function multiplied by a coefficient.

23. The system according to claim 22 wherein the safety function is either equal to a robot-obstacle minimum distance, or the safety function is equal to the robot-obstacle minimum distance reduced by a term computed from a robot-obstacle relative velocity.

24. The system according to claim 16 wherein the target location is a moving target location defined as a function of time.

25. The system according to claim 16 wherein the design robot motion is a tool center point motion in Cartesian space, and the commanded robot motion includes robot joint rotational motions for all joints in the robot.

26. The system according to claim 25 wherein the robot has at least one redundant degree of freedom, where a number of degrees of freedom of the robot joint rotational motions exceeds a number of degrees of freedom of the tool center point motion.

27. A method for dynamic motion planning for a robot, said method executed on a computing device and comprising:

computing a design robot motion based on a target location of a robot tool center point;

computing a commanded robot motion for a current control cycle of calculated motion for the robot based on the design robot motion and obstacle data received from sensors, where the commanded robot motion is provided as feedback for computing the design robot motion for a next control cycle, and where computing a commanded robot motion includes an optimization computation having a multi-term objective function, one or more robot structural limitation constraints and a collision avoidance constraint, where the collision avoidance constraint is an inequality constraint computed from a safety function, where the collision avoidance constraint is that a rate of change of the safety function must be greater than or equal to the negative of the safety function multiplied by a coefficient; and providing the commanded robot motion to a controller module which sends signals executing control of joint motions of the robot.

* * * * *